G. W. DUNHAM.
GAS TANK HOLDER FOR MOTOR VEHICLES.
APPLICATION FILED APR. 20, 1911.

1,074,107.

Patented Sept. 30, 1913.

Witnesses

Inventor
George W. Dunham
By
Attys

UNITED STATES PATENT OFFICE.

GEORGE W. DUNHAM, OF DETROIT, MICHIGAN, ASSIGNOR TO CHALMERS MOTOR COMPANY, OF DETROIT, MICHIGAN, A CORPORATION OF MICHIGAN.

GAS-TANK HOLDER FOR MOTOR-VEHICLES.

1,074,107.     Specification of Letters Patent.     Patented Sept. 30, 1913.

Application filed April 20, 1911. Serial No. 622,261.

*To all whom it may concern:*

Be it known that I, GEORGE W. DUNHAM, a citizen of the United States of America, residing at Detroit, in the county of Wayne and State of Michigan, have invented certain new and useful Improvements in Gas-Tank Holders for Motor-Vehicles, of which the following is a specification, reference being had therein to the accompanying drawings.

In the present state of the art it is usual to provide automobiles with a gas tank for compressed acetylene or other illuminating gas, and as these tanks must be removed for re-charging they are detachably mounted upon the vehicle frame usually adjacent to the step or running board.

It is the object of the present invention to impart a more ornamental appearance to this tank by providing a sheath or surrounding case which may be enameled or otherwise finished. As this sheath is not permanently attached to the tank, the latter may be removed when necessary for recharging, and the sheath itself is not subjected to injury as would be the case were the tank itself to be enameled or finished.

Figure 1:
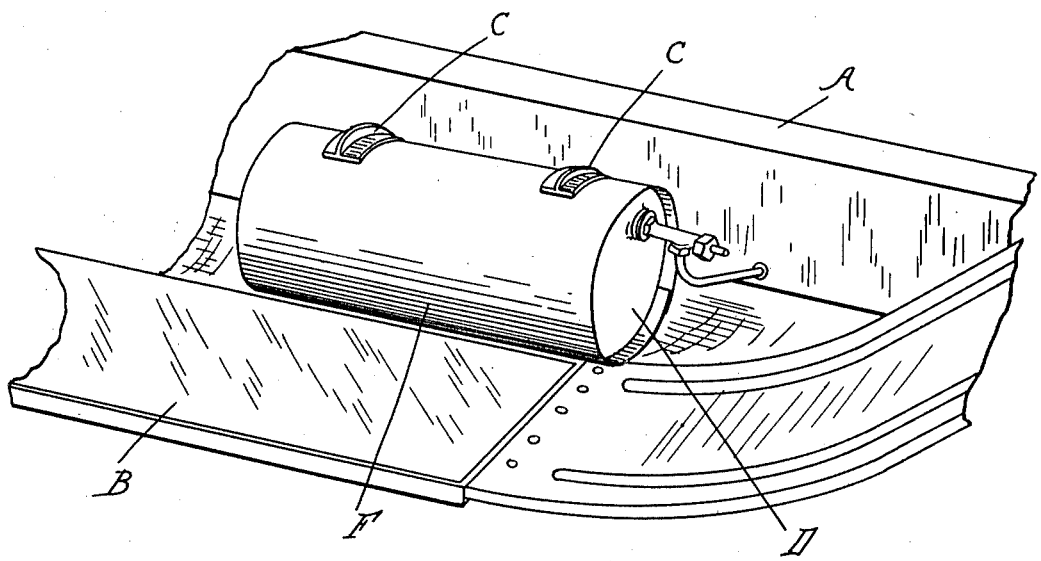
Figure 2:
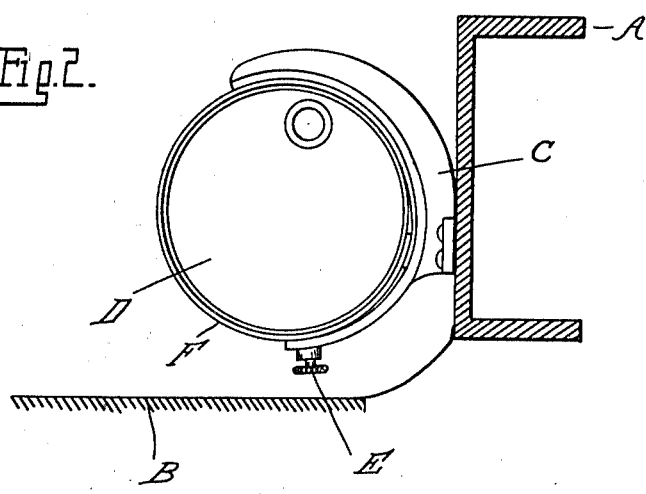

In the drawings, Figure 1 is a perspective view of a portion of an automobile frame and running board showing the gas tank and sheath; Fig. 2 is a cross section.

A is the frame of the vehicle, B is the running board and C are brackets secured to the frame and adapted to receive the gas tank D. This tank is secured in a bracket by suitable clamping means such as the screw clamps E.

F is the sheath or ornamental casing for surrounding and sealing the tank D. This is preferably formed of sheet metal enameled or otherwise finished, bent into cylindrical form, but with its opposite edge unconnected and preferably overlapping. This permits of clamping the tank in the supporting brackets C as the sheath is collapsible and will freely conform to the shape of the tank and the bracket bearing.

Whenever the tanks are to be exchanged the clamps C are loosened, the tank and sheath attached and the sheath is then engaged with the substitute tank and again clamped in the brackets.

What I claim as my invention is:

The combination with a frame, of a gas tank, a bracket fixedly secured to said frame, said bracket having a clamping portion for detachably holding the tank, and an independently removable metallic sheath surrounding said tank and interposed between the latter and the bracket, said sheath in its applied position having free adjacent end portions and being flexible to permit of contraction in its diameter, whereby the tank and sheath are secured by a clamping means common to both.

In testimony whereof I affix my signature in presence of two witnesses.

GEO. W. DUNHAM.

Witnesses:
C. E. GREGORY,
RAY J. MAUER.